Dec. 11, 1962   A. B. BLACKBURN   3,068,393
VOLTAGE REGULATOR
Filed Jan. 18, 1960
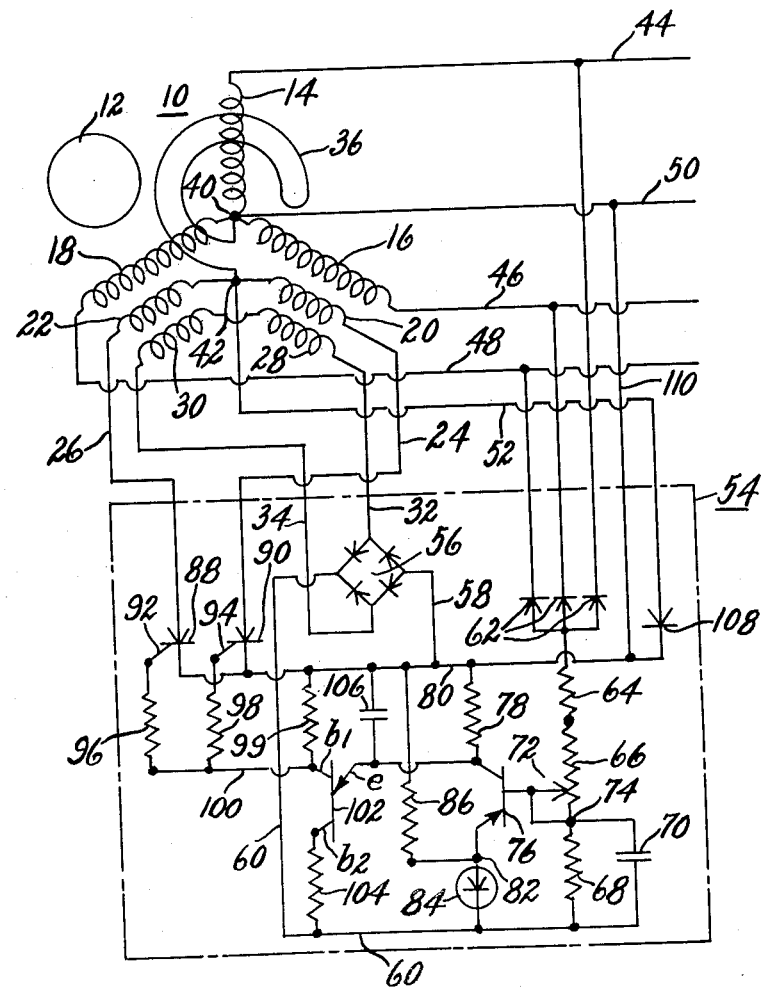
INVENTOR.
ALAN B. BLACKBURN
BY C.R. Meland
HIS ATTORNEY

United States Patent Office 3,068,393
Patented Dec. 11, 1962

3,068,393
VOLTAGE REGULATOR
Alan B. Blackburn, Troy, Ohio, assignor to General Motors Corporation, Detroit, Mich., a corporation of Delaware
Filed Jan. 18, 1960, Ser. No. 2,948
11 Claims. (Cl. 322—28)

This invention relates to a voltage regulating apparatus for use in regulating the output of permanent magnet generators and the like which employ circuit elements of the static semi-conductor type.

One of the objects of this invention is to provide a regulating circuit for controlling current flow through a control winding wherein the control winding is energized from a source of A.C. voltage through one or more control rectifiers which in turn are controlled by a signal voltage.

Another object of this invention is to provide a voltage regulating circuit for an A.C. power source having a control winding wherein the current flow through the control winding is supplied by an A.C. source through one or more control rectifiers and wherein the conduction of the controlled rectifiers is varied in accordance with the output voltage of the A.C. power source.

Still another object of this invention is to provide a voltage regulating circuit including one or more controlled rectifiers whose conduction is controlled by a unijunction transistor, and further wherein the conduction of the unijunction transistor is controlled by a circuit including another transistor, there being a condenser which discharges through the unijunction transistor to cause the controlled rectifier to fire at a predetermined time.

Another object of this invention is to provide a regulating circuit for a permanent magnet A.C. generator having a back winding wherein the current flow through the back winding is controlled by one or more controlled rectifiers and wherein the conduction of the rectifiers is controlled as a function of the output voltage of the generator.

Further objects and advantages of the present invention will be apparent from the following description, reference being had to the accompanying drawing wherein preferred embodiments of the invention are clearly shown.

In the drawings:

The single FIGURE drawing is a schematic circuit diagram of a voltage regulating circuit made in accordance with this invention.

Referring now to the drawing, the reference numeral 10 generally designates a permanent magnet A.C. generator having a permanent magnet rotor 12 which may be driven by an engine or other power source. The stator of the permanent magnet generator includes a three-phase output winding including phase windings 14, 16 and 18. The stator further includes windings 20 and 22 which supply single phase power to lead wires 24 and 26. In addition to these coil windings, the stator has windings 28 and 30 which supply single phase A.C. voltage to the lead wires 32 and 34. A back winding 36 is wound on the stator and this winding has one end thereof connected with the neutral point 40 and has an opposite end thereof connected with the junction 42. In the physical embodiment of this generator, the windings 14, 16, 18, 20, 22, 28, 30 and 36 are all wound on suitable stator iron, and the winding 36 controls the saturation of this stator iron to control the output voltage of the generator.

The phase winding 14 is connected with a lead wire 44 whereas the phase windings 16 and 18 are connected respectively with lead wires 46 and 48. The neutral point 40 is connected with a lead wire 50 as is clearly apparent from an inspection of the drawing. The junction 42 which is connected with coil windings 20 and 22 is connected with a lead wire 52.

The voltage regulating unit of this invention for controlling the output voltage of generator 10 is designated in its entirety by reference numeral 54. This voltage regulating unit includes a single phase, full wave, bridge rectifier 56 connected with lead wires 32 and 34 and having output terminals connected with lead wires 58 and 60. The lead wires 44, 46 and 48 are connected with rectifiers 62, the opposite side of these rectifiers being connected with a resistor 64. It is seen that resistor 64 is connected in series with resistors 66 and 68, the resistor 68 being shunted by a condenser 70. The resistor 66 is of the potentiometer type having a shiftable tap 72 connected with junction 74 and with the base electrode of a transistor 76. The collector electrode of transistor 76 is connected with a resistor 78 and it is seen that the opposite side of this resistor is connected with a lead wire 80. The emitter electrode of transistor 76 is connected with a junction 82. A Zener diode 84 is connected between junction 82 and the lead wire 60. The junction 82 is connected with lead wire 80 through a resistor 86.

The regulator of this invention employs a pair of silicon controlled rectifiers 88 and 90 having control or gate electrodes 92 and 94. The gate electrodes 92 and 94 are connected respectively with resistors 96 and 98 and it is seen that the opposite side of these resistors is connected with a lead wire 100. Lead wire 100 is connected with the base electrode $b_1$ of a unijunction transistor 102. The other base electrode $b_2$ is connected with a resistor 104 which in turn is connected with lead wire 60. The emitter electrode $e$ of the unijunction transistor 102 is connected to one side of condenser 106 and to one side of the resistor 78. It is seen that the opposite side of condenser 106 is connected with the lead wire 80. A rectifier 108 is connected between the lead wire 80 and the junction 42 via the lead wire 52. The lead wire 80 is directly connected with the lead wire 50 by a lead wire 110.

In the operation of the circuit shown in the drawing, the voltage regulating circuit 54 controls the current flow through the back winding 36 of generator 10 to control saturation of the stator magnetic circuit. When the current flow through the back winding is such as to fully saturate the magnetic circuit, the output voltage of the generator is reduced.

It is seen from an inspection of the circuit diagram that the rectifiers 62 provide a direct current voltage to the voltage dividing circuit 64, 66 and 68 which is proportional to the output voltage of the generator phase windings 14, 16 and 18. The direct current output voltage of bridge rectifier 56 provides a bias voltage for the transistors 76 and 102 as this voltage appears between leads 60 and 80. Since the Zener diode 84 is a constant voltage device, it is apparent that the junction 82 will be maintained at some constant voltage relative to the lead wire 60. The voltage of tap point 72 will vary in accordance with the output voltage of the generator 10 and it thus is seen that the voltage appearing across the emitter and base electrodes of transistor 76 varies in accordance with the output voltage of the generator 10. This being the case, the conduction of transistor 76 between emitter and collector is controlled as a function of the output voltage of the generator 10.

When the circuit is energized, the condenser 106 will be charged through a current path that may be traced from lead wire 80 through the condenser 106 through transistor 76 and through the Zener diode 84 to lead wire 60. When the voltage appearing at the collector electrode of transistor 76 and thus at the emitter electrode of unijunction transistor 102 is of a predetermined value, the unijunction transistor will conduct between its emitter electrode and the base electrode $b_1$ and the condenser 106 will then discharge through the resistor 99. The discharging of condenser 106 through the resistor 99 applies a pulse of voltage to the gate electrodes 92 and 94 of silicon controlled rectifiers 88 and 90 causing one of them to fire during a half cycle of applied voltage from coil windings 20 and 22 and causing the other rectifier to fire during the other half cycle of applied voltage. When the silicon controlled rectifiers 88 and 90 fire alternately during a full cycle of voltage, full wave direct current is applied to the back winding 36 of the generator to cause the stator iron to saturate and thus reduce the output voltage of the generator.

It will be appreciated that once the condenser 106 has discharged through the unijunction transistor 102, it once more charges and is then in condition to discharge once more through the unijunction transistor to apply a pulse of voltage to the gate electrodes of silicon control rectifiers 88 and 90. It will also be appreciated that the silicon controlled rectifiers 88 and 90 vary the current supplied to the back winding 36 of the generator by varying the point in the cycle of the applied voltage at which conduction occurs. In other words, the later in the cycle that the rectifiers 88 and 90 fire, the less current is supplied to the back winding 36. The circuit constants of the regulator circuit are such that when an increase in voltage is sensed of greater than a predetermined magnitude between tap point 72 of potentiometer 66 and the lead wire 60, a set of events is set into motion to cause conduction of transistor 76 and conduction of unijunction transistor 102 with a consequent discharging of condenser 106 and in turn the firing of silicon control rectifiers 92 and 90.

The resistor 99, unijunction transistor 102 and condensor 106 operate as a saw-tooth generator to apply pulses of voltage to the gate electrodes 92 and 94 during the time that it is required to supply current to the back-winding 36 of the generator. As noted hereinbefore, this current is full-wave current because of the provision of the two silicon controlled rectifiers 88 and 90.

When the voltage is at the desired regulated value, the potential appearing across the base and emitter electrodes of transistor 76 is not sufficient to cause it to conduct and therefore the unijunction transistor 102 remains non-conductive to prevent the condenser from discharging and also preventing the silicon-controlled rectifiers 88 and 90 from firing.

Rectifier 108 is provided to prevent transient voltage surges in the circuit.

While the embodiments of the invention as herein disclosed constitute preferred forms, it is to be understood that other forms might be adopted.

What is claimed is as follows:

1. A regulated power supply system comprising, an A.C. generator having a first and second output windings and a control winding, said first winding being adapted to supply A.C. voltage to a load, a silicon controlled rectifier connected with said second output winding and with said control winding for varying the current flow through said control winding, and means for controlling the conduction of said rectifier as a function of the output voltage of said first output winding.

2. In combination, an A.C. generator having a permanent magnet rotor and a stator that includes a control winding, and first and second output windings, a controlled rectifier connected between said second output winding and said control winding for controlling the current flow through said control winding, and means for controlling a conduction of said rectifier as a function of output voltage of said first winding.

3. In combination, a permanent magnet A.C. generator having a permanent magnet rotor and a stator formed with first and second output windings and a control winding, a controlled rectifier connected between said second output winding and said control winding for controlling the current flow through said control winding, rectifier means connected with said first output winding for providing a direct current signal that is proportional to the output voltage of said first output winding, and means for controlling the conduction of said controlled rectifier in accordance with said direct current voltage signal.

4. In combination, an A.C. generator having a control winding and first, second and third output windings, a controlled rectifier connected between said second output winding and said control winding for varying the current flow through said control winding, a regulating circuit including semi-conductor means, first rectifier means connected between said third output winding and said regulating circuit for supplying direct current biasing voltage to said regulating circuit, second rectifier means connected between said first output winding and said regulating circuit for applying a sense voltage to said regulating circuit, and means connecting said regulating circuit with said controlled rectifier whereby the conduction of said rectifier is controlled as a function of the output voltage of said first output winding.

5. In combination, a permanent magnet generator having a permanent magnet rotor, a control winding and first, second and third output windings, a controlled rectifier connected between said second output winding and said control winding for controlling the current supplied to said control winding, a voltage regulating circuit including semi-conductor means, first rectifier means connected between said third output winding and said voltage regulating circuit for supplying biasing voltage to said semi-conductor means, second rectifier means connected between said first output winding and said voltage regulating circuit for supplying a direct current sense voltage to said regulating circuit, and means connecting said regulating circuit with said controlled rectifier whereby the conduction of said rectifier is controlled as a function of the output voltage of said first winding.

6. In combination, an A.C. generator having a control winding, a pair of controlled rectifiers connected with said generator and control winding for supplying full wave current to said control winding, voltage regulating means for controlling the conductivity of said pair of controlled rectifiers, rectifier means connected between said generator and said voltage regulating means for applying a direct current sense voltage to said regulating means that varies in accordance with generator output voltage, and means connecting said voltage regulating means in circuit with the gate electrodes of said controlled rectifiers whereby the full-wave current supplied to said control winding is controlled as a function of the output voltage of said generator.

7. In combination, a generator having a control winding and first and second output windings, a controlled rectifier connected between said second output winding and said control winding, and voltage-regulating means connected with said first output winding and with said controlled rectifier for controlling the firing of said rectifier, said voltage regulating means including a condenser and semi-conductor means for applying pulses of voltage to said controlled rectifier.

8. A voltage regulating circuit comprising, a first transistor adapted to be connected with a direct current sense voltage, a unijunction transistor connected with said first transistor, a condenser connected with said unijunction transistor, and a controlled rectifier having a gate electrode connected with one of the base electrodes of said unijunction transistor, said condenser being adapted to discharge through said unijunction transistor to apply a pulse of voltage to said controlled rectifier when said first transistor is conducting.

9. A voltage regulating circuit comprising, a voltage dividing network, a first transistor having a base electrode connected with said voltage dividing network and having emitter and collector electrodes, a unijunction transistor having an emitter electrode connected with said collector electrode of said first transistor, a condenser connected with the emitter electrode of said unijunction transistor, a resistor connected with one of the base electrodes of said unijunction transistor, and a controlled rectifier, said rectifier having a gate electrode connected with said resistor, said condenser being adapted to discharge through said unijunction transistor to apply a pulse of voltage to the gate electrode of said controlled rectifier when said transistor is conducting from emitter to collector.

10. A voltage regulating circuit comprising, a voltage dividing network adapted to being connected with a source of direct current voltage, a pair of lead wires, a first circuit connecting said lead wires including a transistor and a Zener diode, a second circuit connected across said lead wires including a pair of resistors and a unijunction transistor, a condenser connected between the emitter electrode of said unijunction transistor and one of said lead wires, a controlled rectifier, and means connecting the gate electrode of said controlled rectifier with one of the base electrodes of said unijunction transistor.

11. A voltage regulating circuit comprising, a controlled rectifier, a condenser, semi-conductor means connected with said condenser and controlled rectifier providing a discharging circuit for said condenser to said controlled rectifier, and second semi-conductor means adapted to be controlled by a sense voltage connected with said first semi-conductor means for controlling the conduction of said first semi-conductor means.

References Cited in the file of this patent

UNITED STATES PATENTS

| | | |
|---|---|---|
| 2,066,919 | West | Jan. 5, 1937 |
| 2,767,368 | Kober | Oct. 16, 1956 |